United States Patent [19]

Burgess

[11] Patent Number: 5,059,801
[45] Date of Patent: * Oct. 22, 1991

[54] RADIATION DETECTOR

[75] Inventor: Peter H. Burgess, Wantage, England

[73] Assignee: National Radiological Protection Board, Oxfordshire, England

[*] Notice: The portion of the term of this patent subsequent to Oct. 24, 2006 has been disclaimed.

[21] Appl. No.: 395,103

[22] Filed: Aug. 7, 1989

Related U.S. Application Data

[63] Continuation-in-part of Ser. No. 138,372, Oct. 15, 1987, Pat. No. 4,876,454.

[30] Foreign Application Priority Data

Mar. 5, 1986 [GB] United Kingdom ................. 8505394

[51] Int. Cl.$^5$ ........................... G01J 5/22; G01J 5/20; G01J 5/02
[52] U.S. Cl. ......................... 250/370.14; 250/370.01; 250/349; 250/338.4; 250/370.07
[58] Field of Search ..................... 250/370.14, 370.07, 250/370.01, 349, 338.4, 208.2; 356/222

[56] References Cited

U.S. PATENT DOCUMENTS

| 3,564,245 | 2/1971 | Koehler | 250/370.01 |
|---|---|---|---|
| 4,300,048 | 11/1981 | Barbier et al. | 250/349 X |
| 4,423,326 | 12/1983 | Ball | 250/349 X |
| 4,465,370 | 8/1984 | Yuasa et al. | 356/222 X |
| 4,678,916 | 7/1987 | Thomson | 250/370.14 X |
| 4,704,533 | 11/1987 | Rose et al. | 250/349 X |
| 4,749,275 | 6/1988 | Shimomura et al. | 356/222 |
| 4,754,312 | 7/1988 | Langer et al. | 250/370.14 X |
| 4,765,413 | 8/1988 | Spector et al. | 250/349 X |
| 4,870,264 | 9/1989 | Beha | 356/222 X |
| 4,876,454 | 10/1989 | Burgess | 250/370.14 |
| 4,914,738 | 4/1990 | Oda et al. | 356/222 X |

FOREIGN PATENT DOCUMENTS 2653881 6/1978 Fed. Rep. of Germany ........................ 250/370.01

Primary Examiner—Carolyn E. Fields
Assistant Examiner—Jacob M. Eisenberg
Attorney, Agent, or Firm—Fitch, Even, Tabin & Flannery

[57] ABSTRACT

A radiation meter suitable for use as a personal dosemeter comprises a first photo diode having a larger effective sensitive area than a second photo diode and provided with a thin metallic shield attenuating radiation incident on the first diode. A capacitor is connected in series with the first photo diode, the first photo diode and the capacitor being connected in parallel with the second photo diode. The first diode and the capacitor provide an output which falls with incident radiation energy whereas the second photo diode provides an output which increases with radiation energy so that the combined output is substantially uniform with respect to radiation energy. Means are provided for counting pulses produced in the common output so as to obtain a measure of radiation dose monitored by the radiation detector.

9 Claims, 2 Drawing Sheets

RADIATION DETECTOR

CROSS REFERENCE TO RELATED APPLICATION

This application is a continuation-in-part of my prior application Ser. No. 138,372 filed Oct. 15, 1987, now issued as U.S. Pat. No. 4,876,454.

FIELD OF THE INVENTION

The present invention relates to a radiation detector which is particularly intended for use in dosemeters for example small, active personal dosemeters for the same general purposes as Geiger-Muller tubes.

SUMMARY OF THE PRIOR ART

U.S. Pat. No. 4,110,621 to Horn, describes an X-ray detector comprising a scintillator juxtaposed with a P-I-N photo diode. The equipment is essentially intended for use in high speed tomography apparatus intended for producing signals defining an image representing a two-dimensional slice through a patient's body. The scintillator is exposed to X-rays through a small window and couples photons into the diode. The arrangement is not intended for use in a pulse mode, but instead, is intended as an integrator which provides an output directly proportional to the incident X-ray flux.

An article by R. Nowotny entitled, "A Silicon-Diode Pocket Radiation Chirper" in Health Physics, volume 44, (1983), February, No. 2, describes a radiation chirper using either a P-I-N photo diode or an ion implanted low noise diode. However, such a device exhibits a response which is substantially non-uniform with variation in radiation energy. Comparatively high voltage supplies are required to achieve satisfactory counting efficiency.

British Patent No. 1,014,682 describes an energy spectrometer, including three reverse biased P-N junctions, each having a different energy absorption level. Outputs from these three devices are passed through respective load resistors and are amplified, the amplified signals being passed through recorders. The arrangement is intended for the determination of the energy spectrum of a neutron flux.

The International Journal of Applied Radiation and Isotopes, Volume 33, (1982), No. 11 includes a general discussion of silicon diode dosemetry and notes that diode response is strongly dependent upon the photon energy level.

SUMMARY OF THE INVENTION

The main object of the invention is to provide an improved radiation detector, primarily for use as a personal dosemeter, in which at least two diodes are employed, one having a larger effective area than the other, the larger area diode being differently shielded to the smaller area diode and the outputs from the diodes being coupled so that the combined response is substantially uniform with respect to radiation energy.

Another object of the invention is to provide an improved dosemeter including a radiation detector of the foregoing type.

In general, the present radiation detector comprises two photo diodes of which one has a larger effective area than the other. Each diode may be a silicon photo diode having an intrinsic layer between appropriately doped P and N regions. Photon radiation incident on each diode can generate energetic electrons from photo electric interactions with the silicon crystal lattice. Such electrons then lose energy by interaction with the crystal lattice and can generate electron-hole pairs within the intrinsic layer. The electrons thus generated are separated by the inherent field within the device to form a charge pulse which can be amplified by a suitable preamplifier. If the charge pulse is in excess of a threshold as determined by a threshold detector, the pulse may be counted.

A single diode exhibits a response which is substantially non-uniform with variation in radiation energy and which is therefore preferred, according to the invention, to provide compensation by means of at least one further diode in order to obtain a combined output which is substantially uniform with variation of radiation energy. A capacitor may be coupled electrically in series with the larger diode so as to reduce the signal amplitude. The larger diode produces an output which diminishes with radiation energy whereas the smaller diode produces a response which rises with radiation energy.

Other objects and advantages of the invention will be apparent from a consideration of the following specific description of examples of the invention.

DETAILED DESCRIPTION OF PREFERRED EMBODIMENTS

Figure 1:
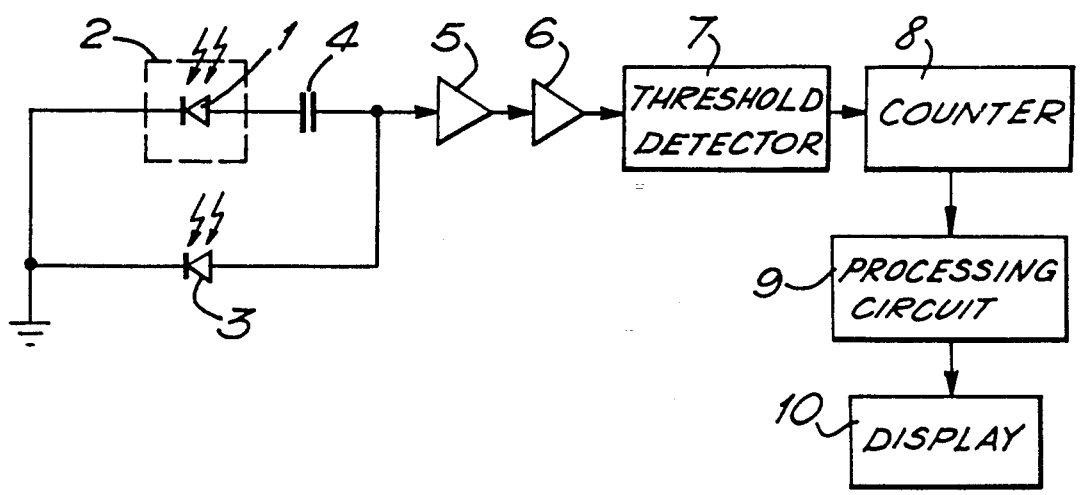
FIG. 1 illustrates schematically a radiation meter incorporating a detector according to the invention.

FIG. 1 illustrates by way of an example, a circuit comprising a detector, constituted in this embodiment by two silicon P-I-N photo diodes 1 and 3, together with other circuit elements constituting a complete meter. In this embodiment of the invention the other elements comprise a capacitor 4 in series with a diode 1, a preamplifier 5 which is arranged to receive the combined output of the diodes 1 and 3, an amplifier 6, a threshold detector 7, and a counter and timer circuit 8. The elements 5 to 8, constitute in this embodiment, a means for indicating the rate of pulses which exceed a threshold. The counter/timer circuit may be coupled to a processing circuit 9, which in known manner can produce a signal denoting the dose rate and the type of dose and provide an alarm signal if either the dose rate or the dose exceeds a threshold. These signals may control, in a manner well known to those skilled in the art, respective sections of the display device 10 such as a liquid crystal display.

The diode 1 is preferably a silicon photo diode having an intrinsic layer between appropriately doped P and N regions. Photon radiation incident on the diode can generate energetic electrons from photo electric and Compton interactions with a silicon crystal lattice. Such electrons then lose energy by interaction with a crystal lattice and can generate electron-hole pairs within the intrinsic layer. The electrons thus generated are separated by the inherent field within the device to form a charge pulse which can be amplified by the preamplifier 5 and the amplifier 6. If the charge pulse is in excess of the threshold determined by the threshold detector 7, the pulse can be counted.

A single diode exhibits a response which is substantially non-uniform with variation in radiation energy and it is preferable, according to the invention, to provide compensation by means of at least one further diode in order to obtain a combined output which is substantially uniform with variation of radiation energy. For this purpose the diode 1, which may be a BPX61 P-I-N diode, is provided with means for attenuating incident radiation. This means may be a brass cap, typically about 2.5 millimeters thick. The construction of such a cap is well known to those skilled in the art. The cap is schematically illustrated in FIG. 1 by the dashed line 2. The provision of such a cap would normally result in a large underestimate for radiations of energy less than, for example, 150 Kv. To compensate for this, the output from a smaller area diode 3 is added to that from the larger diode 1. The diode 3, which may be a BPX65 P-I-N diode from which the glass lens is removed to improve the low energy response, may have, for example, approximately 14% of the effective sensitive area of the diode 1. In addition, a capacitor 4 may be disposed electrically in series with the diode 1, so as to reduce the signal amplitude from the diode 1. In this manner the falling output, from the larger diode, combined with the rising output, from the smaller diode, produces a response which is substantially uniform with respect to radiation energy.

For the particular example of the diode as stated above, the capacitor may be a 180 picofarad capacitor.

Figure 2:
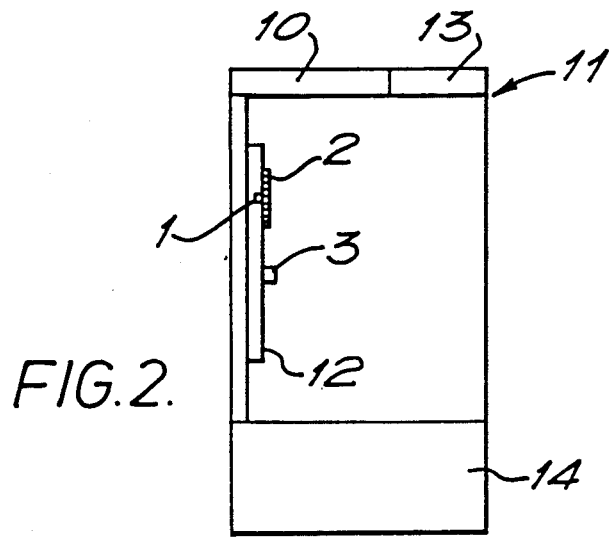
FIG. 2 illustrates a possible physical configuration of the components in the meter according to FIG. 1.

FIG. 2 illustrates by way of an example the physical arrangement of the meter 11, which is electrically arranged according to FIG. 1. The diodes 1 and 3 may be incorporated into an integrated circuit 12 which contains all the detection, amplifying and processing stages of the device.

The larger of the two diodes is covered by the brass shield 2. The two diodes should be mounted at least 6 mm apart to reduce shadowing by the brass shield 2 of the relatively unshielded diode 3 from low energy radiation. The surface of the integrated circuit in which the diodes are incorporated faces away from the body of the wearer. The shield 2 may comprise a disk which is mounted centrally over the diode 1, and is of significant larger area than the active area of the diode 1. This configuration has in essence the same properties as the shield described with reference to FIG. 1. The display 10 is preferably mounted in the top face of the meter for the sake of good visibility. If desired, an audible alarm device 13, driven by the circuit 9 incorporated in integrated circuit 12, may be disposed adjacent to display 10 and may be triggered by the alarm signal. A battery 14, preferably of sufficient capacity to last at least one year, may be disposed in a recess at the bottom of the meter.

A detector as described may readily be arranged to provide a pulse output, which at a suitable threshold, is substantially independent of photon energy and angle of incidence for photons of energy greater than approximately 40 Kv. Such a device has a sensitivity suitable for employment of the device in an active personal dosemeter.

Figure 3:
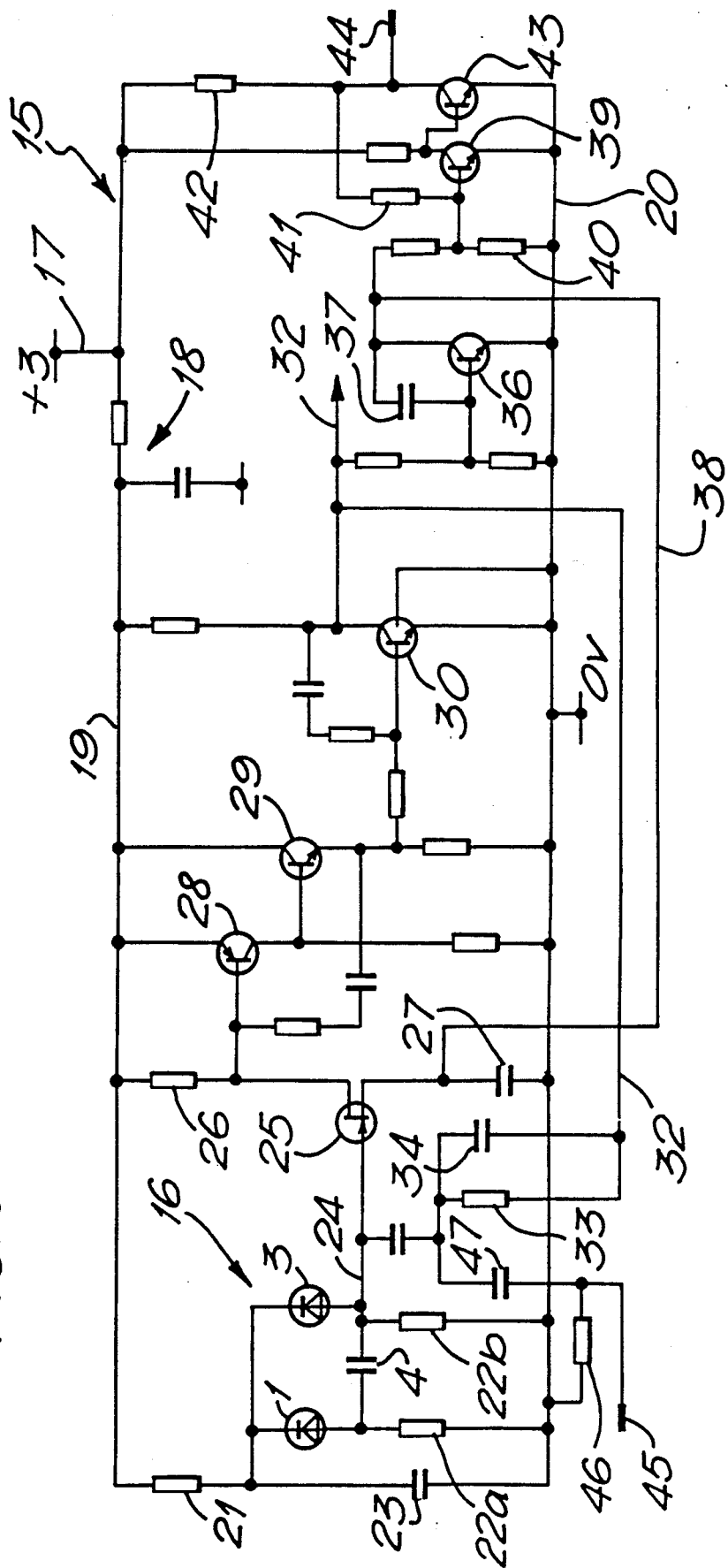
FIG. 3 illustrates an improved detector and preamplifier which may be used in place of the corresponding components in the meter shown in FIG. 1.

FIG. 3 illustrates an improved version of the diode circuit and preamplifier 5 of FIG. 1. FIG. 3 is a schematic of a preamplifier 15, including a diode detector front end 16. The preamplifier 15 forms the same essential function as the preamplifier 5, described with reference to FIG. 1. Diodes 1 and 3 in FIG. 3 correspond to the larger area diode 1 and the smaller area diode 3, as previously described with reference to FIG. 1.

Preamplifier 15 has a positive supply terminal 17 (typically +3 volts), coupled via a stabilizing circuit 18, to a positive rail 19. The circuit has a zero volts rail 20. The diodes 1 and 3 are reverse biased. Diode 1 is biased by the resistors 21 and 22a connected to the rails 19 and 20, respectively, whereas the diode 3 is biased by the resistor 21 and a resistor 22a. Each diode is AC coupled to ground (zero volts line) by means of a common capacitor 23. The larger area diode 1 is in series with a capacitor 4, performing the same function as the capacitor 4 as described with reference to FIG. 1, and diode 3 is in parallel with the series combination of diode 1 and capacitor 4, as before.

A common output line 24 from the diodes is used to couple the combined output to a first amplifying stage comprising a field effect transistor 25, which is connected to the positive rail by way of a resistor 28, and to ground by way of a capacitor 27.

The output from the first amplifying stage is connected to the base of a PNP common emitter transistor 28, of which the collector is coupled to the base of an NPN transistor 29, coupled in a common collector (emitter follower) configuration. The emitter of transistor 29 is coupled to the base of an NPN transistor 30, of which the collector is connected to an output terminal 31. It is at this terminal that the output of the preamplifier appears. This terminal is connected to a threshold detector corresponding to the circuit 6 already described with reference to FIG. 1.

Output terminal 31 of transistor 30 is coupled by way of line 32, a parallel RC circuit comprising resistor 33 and capacitor 34, and capacitor 35 to the base line 24 of transistor 25. Line 32 provides AC feedback to stabilize the operation of the multi-stage amplifier.

The circuit preferably includes means for monitoring the DC leakage current of the diodes and for this purpose the terminal 31 is connected to the input of a transistor 36, which is connected as a Miller integrator by means of a capacitor 37, connected between the collector and emitter of the transistor 36. The collector of the transistor 36 is also coupled by way of a DC feedback line 38 to the junction of capacitor 27 and field effect transistor 25. The amplifier 36 feeds a threshold detector comprising transistor 39, of which the base voltage is set by the resistor chain 40, 41 and 42, and an output transistor 43. An output terminal 44 is connected to the collector of transistor 43 follower. Output line 44 provides an output to denote excessive leakage current from the diodes.

A means of testing the preamplifier with a positive-going test pulse comprises an input terminal 45, which is connected to the zero-volts line 20 by means of resistor 46, and to the input line 24 for transistor 25 by way of capacitor 47 and capacitor 35.

The foregoing description is given by way of example only and many variations in the examples may be made without departing from the scope and spirit of the claims that follow.

I claim:

1. A radiation detector for generating pulses in response to incident radiation, comprising:
   first and second photo diodes, said first photo diode having a substantially larger effective sensitive area than that of the second diode;
   means for attenuating radiation incident on said first diode; and means for combining the output of said first and second diodes.

2. A radiation detector according to claim 1, wherein the said means for attenuating comprises a metallic shield.

3. A radiation detector according to claim 1, further comprising means for reducing the amplitude of pulses produced by the said first diode.

4. A radiation detector according to claim 3 in which the said means for reducing comprises a capacitor electrically connected in series with the said first diode.

5. A radiation detector according to claim 1, further comprising means for counting pulses which exceed a threshold in the said output.

6. A radiation detector according to claim 1 wherein each of said photo-diodes is a PIN diode.

7. A radiation detector for generating pulses in response to incident radiation, comprising:
first and second photo-diodes, said first photo-diode having an effective sensitive area substantially larger than that of the said second photo-diode;
means for attenuating radiation incident on said first diode;
a capacitor electrically in series with said first photo-diode;
circuit means connecting said second photo-diode in parallel with the said first diode and the said capacitor; and
amplifying means having an input coupled to said circuit means.

8. A radiation dosemeter for generating pulses in response to incident radiation, comprising:
first and second photo-responsive means, said first photo-responsive means having an output response which falls with increasing incident radiation energy and said second photo-responsive means having an output response which rises with increasing incident radiation energy;
circuit means for providing a combined output from the photo-responsive means, said combined output being substantially constant with respect to incident radiation energy; means for detecting in said combined output pulses exceeding a threshold; and means for counting said pulses.

9. A radiation dosemeter according to claim 8, wherein said first photo-responsive means comprises a first PIN diode having a metallic shield and said second photo-responsive means comprises a second PIN diode.

* * * * *

UNITED STATES PATENT AND TRADEMARK OFFICE
CERTIFICATE OF CORRECTION

PATENT NO. : 5,059,801
DATED : October 22, 1991
INVENTOR(S) : Peter H. Burgess It is certified that error appears in the above-identified patent and that said Letters Patent is hereby corrected as shown below:

In Column 6, line 19 (Claim 8), after "energy;" the words "means for" should start a new paragraph.

Signed and Sealed this

Sixth Day of April, 1993

*Attest:*

STEPHEN G. KUNIN

*Attesting Officer*   Acting Commissioner of Patents and Trademarks